United States Patent

[11] 3,542,073

[72] Inventor Edward L. Holbrook
Pinole, California
[21] Appl. No. 723,853
[22] Filed April 24, 1968
[45] Patented Nov. 24, 1970
[73] Assignee Amot Controls Corporation
a corporation of California

[54] MULTIPLE SIGNAL PILOT FOR FLUID LOGIC VALVE
7 Claims, 5 Drawing Figs.

[52] U.S. Cl. .................................................137/625.66,
137/608, 251/331, 251/63.5
[51] Int. Cl. .................................................F16k 11/07,
F16k 31/143
[50] Field of Search..........................................137/625.66,
608; 251/367, 331, 63.5

[56] References Cited
UNITED STATES PATENTS
| | | | |
|---|---|---|---|
| 2,316,944 | 4/1943 | Ernst ........................... | 137/625.66 |
| 3,237,641 | 3/1966 | Audemar..................... | 137/625.66X |
| 3,326,239 | 6/1967 | Saint-Joanis et al. ......... | 137/625.66 |
| 3,017,901 | 1/1962 | Hicks ........................... | 251/331 |
| 2,887,127 | 5/1959 | Broadbent.................... | 251/367 |

FOREIGN PATENTS
| | | | |
|---|---|---|---|
| 1,014,909 | 12/1965 | Great Britain................ | 137/625.66 |

*Primary Examiner*—Henry T. Klinksiek
*Attorney*—Warren, Rubin, Brucker & Chickering ABSTRACT: A plurality of mechanical and/or fluid actuators are arranged in tandem for effecting displacement of a valve part having a connection to one of the actuators. By this arrangement, operation of a valve is achieved by one or more of a plurality of independent and isolated signals, each actuator being individually responsive to one of these signals for effectuating displacement of the valve part. In at least one of the embodiments, each of the actuators are embodied by reciprocating and engageable pistons for responding to a plurality of independent fluid pressure signals. In another embodiment at least one of the actuators takes the form of a reciprocating member responsive to a mechanical signal such as the displacement of a solenoid plunger. By the provision of optional multiple fluid and mechanical actuation of a valve, the invention may be advantageously employed with a fluid logic valve system such as disclosed in assignee's U.S. Pat. application Ser. No. 707,271 filed Feb. 21, 1968.

Patented Nov. 24, 1970
3,542,073
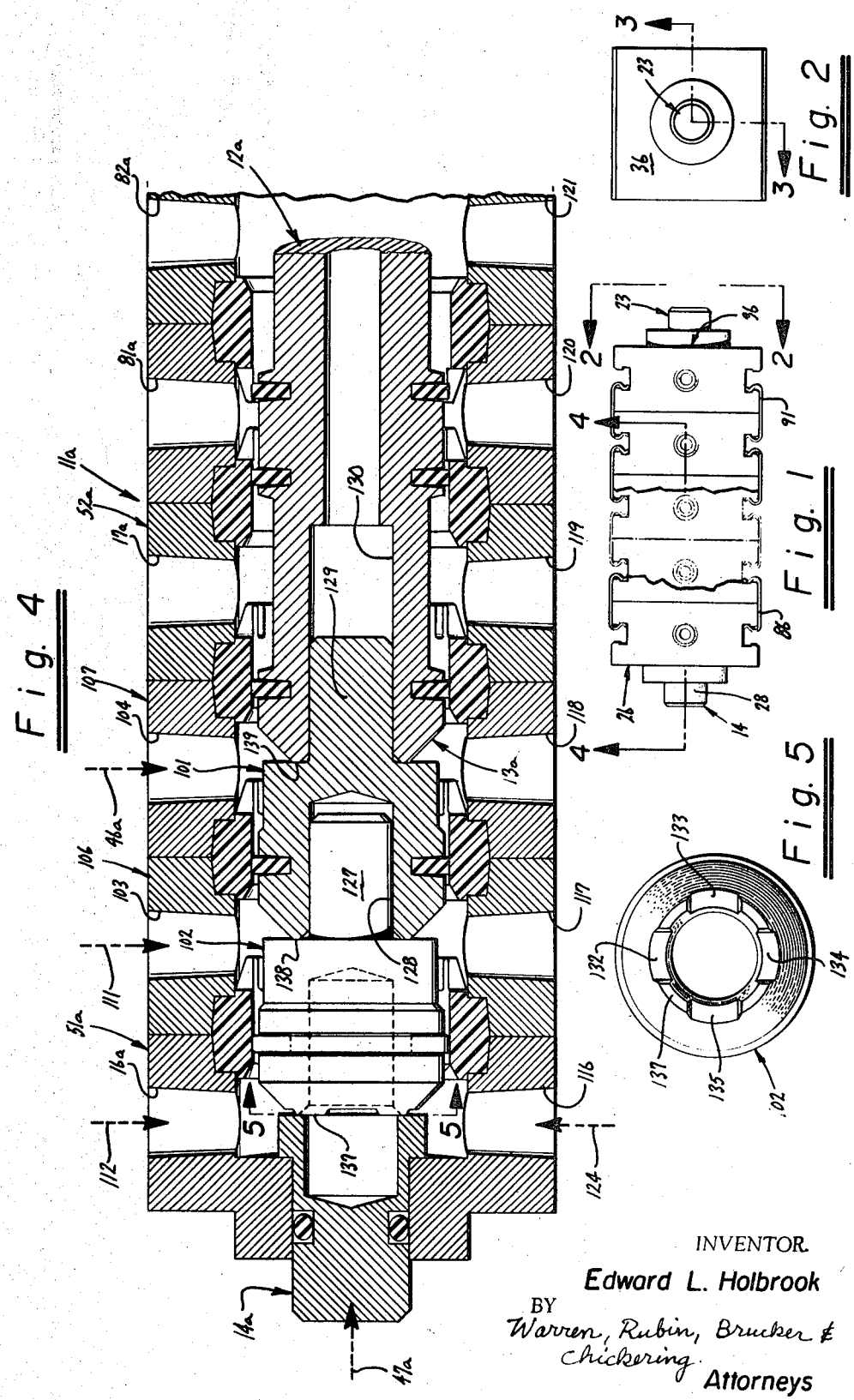
INVENTOR.
Edward L. Holbrook
BY Warren, Rubin, Brucker & Chickering
Attorneys

MULTIPLE SIGNAL PILOT FOR FLUID LOGIC VALVE

The invention relates to the field of fluid logic valve systems and more particularly to a multiple signal pilot for use with such a valve system. Fluid logic valve systems as referred to herein are exemplified by assignee's copending U.S. Pat. application Ser. No. 707,271 filed Feb. 21, 1968, now U.S. Pat. No. 3,516,442.

As set forth in the above U.S. application, fluid logic and/or control systems relate to the principle of operation and design of certain fluid valve systems capable of performing a wide variety of fundamental control functions. Such functions include AND, OR, NOT, NAND/NOR logic as well as time and memory control operations. Additionally, fluid systems are capable of delivering substantial power outputs directly to a load without requiring additional power amplification between the control portion of the system and the load which is to be operated.

While the above introduction relates to fluid logic systems in general, the present invention pertains particularly to means for piloting or actuating a valve in such a system. To take full advantage of the wide variety of control arrangements and functions obtainable with fluid control valves, it is desirable to provide a multisignal piloting means for operating each of the valving mechanisms. A multisignal pilot as disclosed herein is capable of handling a plurality of input or control signals yet at the same time maintain each of the signals isolated from one another. Additionally, it is desirable that such a multiple signal piloting means or apparatus be as compact and efficient as possible so as to reduce the volume of the entire fluid logic and/or control system.

Furthermore, in many fluid logic or control systems, a variety of signal types may be present. For example, it may be desirable to actuate a valve not only by fluid pressure signals but also in response to a signal taking the form of mechanical displacement. Such displacement may be provided by a solenoid plunger or manual actuation by an operator. It is particularly advantageous to have a piloting means for a valve which is capable of response to either type of signal. Presently used fluid valving systems are not capable of providing this versatility without sacrificing one or more other desirable features of a piloting or valve mechanism, such as speed of operation, compactness and low cost.

Existing piloting systems with their limited signal handling capabilities necessitate the use of additional valving and piloting mechanisms for operating a valve according to a predetermined logic scheme. That is, in order to provide a logical OR function it is common to connect a pair of gate valves in parallel to a single signal pilot of a control valve. In this case the pilot and its associated control valve may be actuated by the transmission of a fluid signal through either of the gate valves to provide the OR logic control. It will be appreciated that such an arrangement is cumbersome, expensive and generally inefficient in a large fluid logic system.

In view of the above, it is an object of the present invention to provide a compact piloting mechanism for operating a valve in response to a multiplicity of control signals.

It is a further object to provide such piloting mechanism having a simplicity of design for low cost manufacturing and yet provide reliable long life operation.

It is another object of the present invention to provide a compound multisignal valve pilot capable of performing logic functions such as used in fluid logic and/or control systems.

A still further object of the present invention is to provide a multisignal valve pilot having heretofore unobtainable versatility in its response to a variety of control signals.

Referring to the drawings:

FIG. 1 is a side elevation of the universal exterior of an assembled valve and compound multiple signal pilot constructed in accordance with the present invention;

FIG. 2 is an end view of the assembly shown in FIG. 1;

FIG. 4 is an enlarged sectional view of another form of multiple fluid signal pilot and valve taken along lines 4-4 of the universal assembly shown in FIG. 1;

FIG. 5 is an end view of a portion of the multiple signal pilot taken generally along lines 5-5 of FIG. 4.

Figure 3:
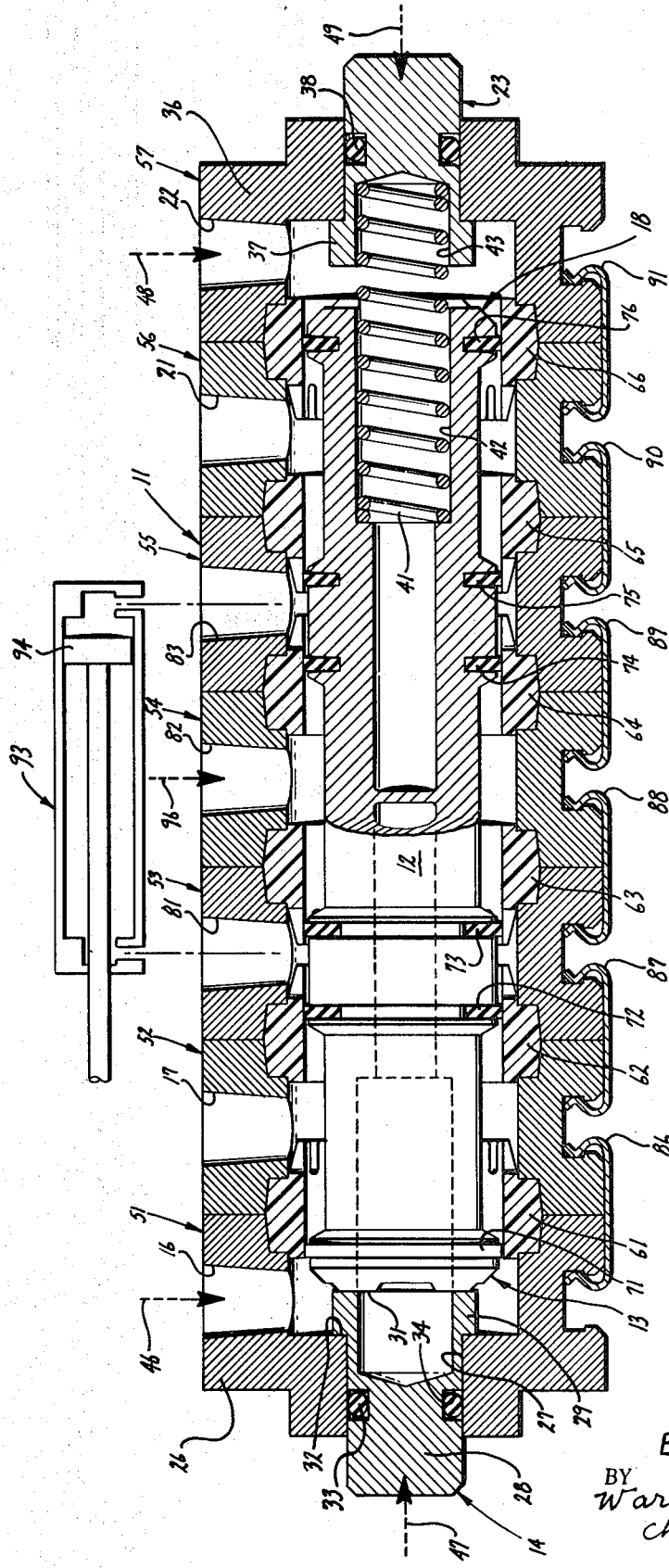
FIG. 3 is an enlarged cross-sectional view of one form of combination valve and multiple signal pilot at each end thereof taken generally along orthogonal lines 3-3 of the universal assembly shown in FIG. 2.

In general, the invention provides for actuation of a valve by a plurality of separate yet interacting mechanical and/or fluid signals. With reference to FIG. 3, the multiple signal pilot of the present invention is adapted for use in combination with a valve having a valve housing 11 and a reciprocating valve part 12 therein, and comprises briefly a multiplicity of axially alined actuators 13 and 14 for displacing valve part 12. Actuator 13 is here composed of a piston carried by housing 11 for reciprocation therein and having a connection to part 12 for axial displacement thereof, it being noted that piston 13 may be formed as here shown as an integral end portion of part 12. Housing 11 is formed with a pair of fluid ports 16 and 17 disposed on opposite sides of piston 13 and which are adapted for connection to a source of fluid under pressure for reciprocally driving the piston. The second actuator 14 is carried by the housing for reciprocation into engagement with piston 13 for joint displacement of the piston and valve part 12.

Preferably, and as here shown, a second piston actuator 18 is provided at the opposite end of the valve part 12 between a second pair of ports 21 and 22; and a second actuator member 23 is mounted for reciprocation in the housing at the outside of piston actuator 18 and functions similarly to actuator 14 to effect joint displacement, to the left as seen in the FIG. of piston actuator 18 and the attached valve part 12. Ports 21 and 22 are also adapted for connection to a source of fluid under pressure in the same manner as ports 16 and 17 to effect a reciprocal driving of piston 18. With the provision of the pairs of actuators at the opposite ends of the valve parts displacement of the valve part in both of its reciprocating directions is obtained.

In both of the forms of the invention illustrated in the accompanying drawings, the valve part may be piloted by either fluid or mechanical actuation or by a combination of the two. An end wall 26 of the housing is here formed with a bore having an axis parallel to the displacement of the valve part 12 and pistons 13, and actuator 14 has a cylindrical stem portion 28 mounted for reciprocation in bore 27 and with a relatively enlarged head portion 29 internally of the housing which is movable into and out of engagement with the adjacent end face 31 of piston 13. The enlarged head portion 29 is formed to abut against the internal face 32 of end wall 26 so as to limit the outward (to the left) displacement of actuator 14, as illustrated in FIG. 3. Preferably the stem or shank portion 28 of member 14 is mounted in sealed sliding engagement with the wall of bore 27, the seal being here provided by an O-ring 33 mounted in a recess 34 and which engages the walls of the recess and bore to provide a sliding seal. In like manner actuator member 23 at the opposite end of the valve assembly is mounted for reciprocation in a bore provided in housing end wall 36, is formed with an enlarged internal head portion 37 and is sealed for sliding engagement in the bore by O-ring 38.

If desired and as here shown, the valve assembly may be biased to the left as seen in FIG. 3, by the inclusion of a spring 41 mounted in compression between valve part 12 and actuator 23, it being noted that these two parts are here formed with confronting axially alined recesses 42 and 43 for receipt of the opposite ends of spring 41. The inclusion of spring 41 is optional and is used where an added spring biasing of the valve is desired. As an example, it may be desirable to actuate the valve in response to a pair of logic signals, one being a fluid signal as represented by dotted arrow 46 and the other a mechanical signal as represented by dotted arrow 47. The mechanical signal may be obtained from a moving part of the machine being controlled or automated, by a solenoid actuator, or manual actuation. By such a piloting arrangement, a logical OR function is provided. Also the provision of actuator 14 permits a manual overriding of what might otherwise be an automatic operation of the valve. As will be understood, the actuators 18 and 23 at the opposite end of the valve assembly provide a similar combination and optional operation whereby valve part 12 may be driven between its operative terminal positions by a logical OR function at either remote end of the valve assembly.

As will be observed, the disengageable cooperation between the actuators has the advantage of decreasing the inertia and frictional drag on the reciprocating valve part. Thus with spring 41 removed, for example, valve 12 may be reciprocated at high speed in response to alternate application of fluid signals 46 and 48 applied to ports 16 and 22, respectively. In such case, both members 14 and 23 will remain stationary in the positions as shown in the drawing, thus eliminating the additional drag on the reciprocating pistons 13 and 18 and valve member 12.

The valve housing is preferably constructed from a plurality of stacked modular sections 51, 52, 53, 54, 55, 56, and 57 similar in construction to the arrangement disclosed in application Ser. No. 707,271. The adjacent pairs of sections cooperate to support a plurality of longitudinally spaced annular members 61, 62, 63, 64, 65, and 66 which in turn provide internal cylindrical surfaces for slideably engaging a plurality of longitudinally spaced sealing rings 71, 72, 73, 74, 75, and 76 carried by the reciprocating part 12. It will be noted that rings 71 and 76 at the opposite ends of the assembly remain in sealed sliding engagement with members 61 and 66 to provide pistons 13 and 14 while rings 72, 73, 74 and 75 are positioned to travel over and off from the solid portions of members 62, 63, 64, and 65 so as to provide a valving operation. Each of the sections are provided with ports so that a pair of ports are located on opposite sides of each of the members 61—66. Ports 16, 17, 21 and 22 are here shown provided in sections 51, 52, 56 and 57 respectively. Additional ports 81, 82 and 83 are provided in sections 53, 54, and 55. Each of the housing sections may be secured together by the use of a plurality of spring clips 86, 87, 88, 89, 90 and 91. The particular modular construction of the housing and the use of the spring clips 86—91 are more fully described in application Ser. No. 707,271.

In the arrangement of the parts as illustrated in FIG. 3, the valve part 12 is displaced to its left hand position. In such position, it will be observed that valve ring 72 is in engagement with the solid portion of member 62 thus blocking communication between ports 17 and 81. Valve ring 73 is moved off the solid portion of member 63 thus establishing communication between ports 81 and 82. Valve ring 74 is engaged with the solid portion of member 64 thus blocking communication between ports 82 and 83; while valve ring 75 is moved off from the solid portion of member 65 to establish communication between ports 83 and 21. Upon movement of the valve part 12 to its right hand position as seen in FIG. 3, valve rings 72 and 74 move off from the solid portions of members 62 and 64 to thereby establish communication between ports 17 and 81 and between ports 82 and 83; while valve rings 73 and 75 move onto the solid portions of members 63 and 65 to thereby block communication between ports 81 and 82, and between ports 83 and 21. In both of the left hand and right hand positions of the valve part, piston rings 71 and 76 remain in sealed engagement with members 61 and 66. The arrangement illustrated is sometimes referred to as a four-way double piloted valve.

One use of the valve structure as above discussed is illustrated by way of example in FIG. 3 where ports 81 and 83 are shown connected to the opposite ends of a cylinder 93 having a piston 94 mounted for reciprocation therein. A source of fluid under pressure (not shown) is connected to port 82 as indicated by arrow 96. With the disposition of the parts as illustrated in FIG. 3, fluid pressure entering through port 82 is passed through open valve 73 and port 81 to the left end of cylinder 93 thus driving piston 94 to the right as illustrated. The application of either a fluid signal 46 or mechanical signal 47 to the pilot at the left hand end of the assembly will displace the valve part 12 to the right against the resistance of spring 41. This displacement will shut off fluid communication between ports 82 and 81 and open communication between port 81 and port 17 which is shown open to the atmosphere thus venting the left end of cylinder 93. At the same time, fluid pressure entering port 82 will be communicated past open valve 74 to port 83 and to the right hand end of cylinder 93 thus driving piston 94 to the left. At the same time, port 83 is closed off from atmospheric port 21 by valve 75. Upon discontinuance of both signals 46 and 47, the valve part 12 will be again displaced to the left by spring 41; or in the a absence of spring 41 such return may be effected by the application of a fluid or mechanical signal 48 or 49 at the right-hand end of the assembly.

A modified form of the invention is illustrated in FIG. 4 wherein a plurality of fluid actuators are provided to function in combination with each other and with a mechanical actuator for mechanical signal and multiple fluid signal displacement of the valve part. The additional actuator in the present instance is composed of one or more free floating pistons 101 and 102 mounted between piston 13a and actuator member 14a; and housing 11a is provided with fluid ports 16a, 103, 104 and 17a for reciprocally driving the floating pistons 101 and 102 into engagement with a displacement of pistons 13a and valve member 12a; and member 14a is moveable inwardly into engagement with piston 102 for joint displacement of the assembly to the right as seen in FIG. 4. Reciprocation of piston 13a is effected by fluid under pressure conducted through ports 17a and 104.

As will be observed, the modular construction of the valve housing facilitates the addition of one or more free floating piston actuators of the type above described by removing the end section 51 and 51a of the housing and adding on standard housing section 106 and 107 between the end section 51a and section 52a, one housing section being added for each free floating piston used. Thus any number of such free floating pistons from one on up may be utilized. As will be understood, any one of the free floating pistons may be actuated to displace valve member 12a and accordingly a multifluid signal pilot is provided in response to any one or more of fluid signals 112, 111 and 46a and if desired, a mechanical signal pilot is provided by the response of actuator 14 to a mechanical signal 47a. In the arrangement illustrated in FIG. 4, it will be noted that port 46a is located between pistons 101 and 13a. Accordingly a fluid pressure pulse passed through port 46a will separate these two pistons driving piston 101 to the left and piston 13a to the right as seen in FIG. 4. Similarly port 103 is located between pistons 101 and 102 and a fluid pressure pulse passed through port 103 will separate these two pistons driving piston 101 to the right and piston 102 to the left as seen in the drawing. Thus in each instance a minimum number of parts are connected for joint displacement with valve part 12a with attendant minimization of frictional drag.

The multifluid signal pilot assembly may also be used at the right hand side of the assembly of FIG. 4 or a simpler fluid and mechanical actuator as illustrated in FIG. 3 in either case providing bidirectional operation of valve part 12a.

Preferably, each of the housing sections shown in FIG. 4 provide an additional fluid port 116, 117, 118, 119, 120, and 121 located directly opposite ports 112, 111, 104, 17a, 81a and 82a. As described in the above-referred to application, Ser. No. 707,271 these additional ports allow the joining of two fluid signals without necessitating extra or auxiliary fluid connections. For example, ports 16a and 116 permit the introduction of both fluid signals 112 and 124 for driving piston 102 to the right. If it is not convenient to use these extra ports, they may be plugged as described in the above noted application.

As a further feature of the present invention, the several pistons 102, 101 and 13a are slideably engaged for enhancing mutual axial support thereof. As will be observed, piston 102 is formed with an axially extending stud 127 which is mounted for reciprocation in a cylindrical end socket 128 formed in the adjacent end of piston 101; and piston 101 is formed with a similar stud 129 mounted for axial reciprocation in bore 130 formed in valve member 12a at the piston end 13a.

Preferably each of the pistons 102, 101 and 13a, and piston 13 in the first embodiment is formed on one of its contacting end faces with cross slots, see FIG. 5, to eliminate any vacuum coupling between the engaged parts. Legs 132, 133, 134, and 135 providing a cruciform shape on end faces 137, 138 and 139 of the pistons maintain a satisfactory area of contact between the engaged parts while allowing quick release therebetween to enhance operating speed of the assembly. It will be observed that the apparatus of the present invention provides a multiple signal pilot actuator which is responsive to a plurality of fluid and mechanical signals to provide efficient and high speed operation. It will be further observed that the apparatus maintains each of the fluid signals isolated from one another. For example, piston 102 operates not only as an actuator but also isolates fluid signals 112 and 111 from comingling The advantage of this arrangement is especially realized in a fluid logic system where it is usual to have a multiplicity of fluid signals operative throughout the system. Since each of the signals may represent a separate logic state, it is necessary to maintain isolation between the various signals; and this feature is conveniently and automatically provided by the present apparatus.

I claim:

1. In a valve having an elongated housing formed with an internal axially extending chamber and an axially reciprocating valve part in said chamber, the combination of a fluid and mechanical actuator for said valve part comprising:

a piston carried by said housing for axial reciprocation in said chamber between said valve part and an end wall of said housing and being connected to said valve part for reciprocal displacement thereof;

said housing being formed with fluid ports adapted for connection to a source of fluid under pressure for reciprocally driving said piston;

said end wall being formed with an axial bore therethrough; and a second actuator mounted for axial reciprocation in said bore and slidably sealed engagement therewith and projecting exteriorly of said housing for engagement and axial displacement and being movable into and out of engagement with said piston for effecting joint displacement of said piston and valve part in an axial direction away from said end wall.

2. The combination defined in claim 1 and a spring mounted in said housing and biasing said valve part and piston axially toward said end wall and second actuator.

3. The combination defined in claim 1 one of said ports being positioned between said piston and valve part; and said valve part and piston being formed with substantially equal confronted axial pressure responsive areas for balancing opposed axial forces on said valve part and piston due to fluid under pressure applied through last named port into said chamber.

4. The combination defined in claim 1:

and a free floating piston mounted in said chamber for axial reciprocation between said first named piston and second actuator;

certain of said fluid ports being positioned for reciprocally driving said floating piston into engagement with and displacement of said first piston and second actuator; and said second actuator being movable into engagement with said free floating piston for joint displacement thereof with said first named piston and said valve part in an axial direction away from said end wall.

5. The combination defined in claim 1:

and a plurality of free floating pistons carried by said housing for axial reciprocation in said chamber and being positioned in end to end relation between said first named piston and second actuator;

certain of said fluid ports being positioned for selectively reciprocally driving said floating pistons for displacement of said first named piston and second actuator; and said second actuator being movable into engagement with the adjacent free floating piston for joint displacement of said free floating pistons and valve part in an axial direction away from said end wall.

6. In a valve having an elongated housing formed with an internal axially extending chamber and an axially reciprocating valve part in said chamber, the combination of:

a first piston carried by said housing for axial reciprocation in said chamber and being connected to said valve part for reciprocal displacement thereof;

a free floating piston carried by said housing for axial reciprocation in said chamber in confronting relationship to said first piston; and said housing being formed with fluid ports adapted for connection to a source of fluid under pressure for selectively reciprocally driving said pistons.

7. The combination defined in claim 6 and slidably engaged axially extending guide portions on said pistons maintaining axial alinement thereof during relative reciprocation.

UNITED STATES PATENT OFFICE
CERTIFICATE OF CORRECTION

Patent No. 3,542,073   Dated November 24, 1970

Inventor(s) Edward L. Holbrook

It is certified that error appears in the above-identified patent and that said Letters Patent are hereby corrected as shown below:

Column 4, line 9, delete "a".

Column 4, line 22, change "a" to --and--.

Column 4, line 32, change "51 and" to --51 or--.

Column 6, line 45, change "alinement" to --alignment--.

SIGNED AND
SEALED
MAR 9 1971

(SEAL)
Attest:

Edward M. Fletcher, Jr.
Attesting Officer

WILLIAM E. SCHUYLER, JR.
Commissioner of Patents